United States Patent Office 3,308,131
Patented Mar. 7, 1967

3,308,131
TERTIARY CARBAMYL TRIAZOLES
Blaine C. McKusick, Wilmington, Del., assignor to E. I. du Pont de Nemours and Company, Wilmington, Del., a corporation of Delaware
No Drawing. Filed July 9, 1964, Ser. No. 381,530
9 Claims. (Cl. 260—294)

This application is a continuation-in-part of my copending application Ser. No. 242,635, filed December 6, 1962, which was a continuation-in-part of Ser. No. 172,772, filed February 12, 1962, both now abandoned.

This invention relates to new heterocyclic compounds and particularly to 1,2,4-triazoles having a carbamyl group on nuclear nitrogen.

Heterocyclic compounds are an important class of organic products. Of these the triazoles have been found to have varied utility. For example, Potts, Chem. Revs., 61, 87–127 (1961), shows that various 1,2,4-triazoles have found commercial application as herbicides, defoliants, photographic reagents, rubber chemicals and in polymers.

There have now been obtained new and useful 1,2,4-triazoles having a tertiary carbamyl group on nuclear nitrogen in which the carbamyl nitrogen is attached to different, i.e., separate saturated aliphatic carbons, and in which any members on the annular carbons of the triazole nucleus are bonded to hydrogen, halogen, carbon or sulfur. These triazoles are particularly useful as insecticides.

The "tertiary carbamyl group" attached to a triazole nitrogen is defined as a di-aliphatically substituted carbamyl group, including the thiocarbamayl group i.e., the group

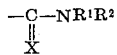

wherein X is O or S and $R^1$ and $R^2$ are aliphatic groups containing, together, up to a total of 14 carbons. The groups $R^1$ and $R^2$ can be joined together to form a divalent radical which with carbamyl nitrogen is a heterocyclic ring. The triazole nuclear carbons can have substituents containing up to a total of 14 carbons.

The new compounds of this invention can be represented by the formulas

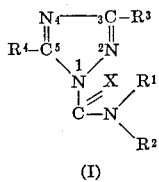   and   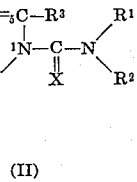

(I)                              (II)

wherein X is as defined above, and $R^1$, $R^2$, $R^3$ and $R^4$ are as defined below.

The compounds of this invention can exist in isomeric forms. Although the more common form is that designated as (I), the isomer (II) can be obtained. In the instances where $R^3$ and $R^4$ are the same, these formulas are identical. However, where $R^3$ and $R^4$ are not the same, isomers are capable of existence. This is not surprising in view of the literature on simple triazoles (see Elderfield, "Heterocyclic Compounds," John Wiley, N. Y., 1957, vol. V, pages 91–92, showing that a mixture of isomers may result from synthetic procedures). In the detailed description that follows, in some instances the presence of isomers has been indicated, namely, as 3(5)-, 5(3)-. Isomers exist in all instances where the groups on the nuclear carbons adjacent to the annular nitrogens are different but sterically of similar size. The compounds of this invention are generally named as the 3-isomer rather than as the 5-isomer, particularly since the compounds usually obtained have the smaller substituent on the 5-position.

In formulas I and II, $R^3$ and $R^4$ together have no more than 14 carbons and are free of aliphatic unsaturation. $R^3$ and $R^4$ can be hydrogen, halogen (fluorine, chlorine, bromine), sulfonyl, mercapto, cyano, hydrocarbyl, halohydrocarbyl, nitrohydrocarbyl, hydrocarbyloxycarbonylhydrocarbyl, hydrocarbylsulfonyl, hydrocarblmercapto, nitrohydrocarbylmercapto, halohydrocarbylmercapto, aminohydrocarbylmercapto, hydrocarbyloxyhydrocarbyl.

Representative groups included in the foregoing list include alkyl, aryl, aralkyl, nitroaryl, nitroalkyl, haloaryl, haloalkyl, alkoxyaryl, aryloxyalkyl, alkoxyalkyl, alkoxycarbonylalkyl, alkylmercapto, aralkylmercapto, alkoxymercapto, nitroarylmercapto, haloarylmercapto, haloalkylmercapto, alkylsulfonyl, dialkylaminoalkylmercapto, alkoxycarbonylalkylthio, pyridino, piperidino, and the like.

Preferably, $R^3$ and $R^4$ together have no more than 6 carbons.

$R^1$ and $R^2$ are aliphatic groups containing up to 14 carbons, or together, a divalent group which forms a heterocyclic ring with the carbamyl nitrogen. $R^1$ and $R^2$ may be hydrocarbyl, hydrocarbyl containing oxygen, i.e., hydroxyhydrocarbyl, alkoxyhydrocarbyl, carboxyhydrocarbyl, or hydrocarbyl containing nitrogen, i.e., carbonamidohydrocarbyl, cyanohydrocarbyl, aminohydrocarbyl, and dialkylaminohydrocarbyl.

In addition, when $R^1$ and $R^2$ are joined to form a heterocyclic ring with the carbamyl nitrogen, $R^1$ and $R^2$ are divalent hydrocarbyl or hydrocarbyl interrupted by an ethereal oxygen. Said divalent groups may contain 4–6 carbons in the ring chain; and in addition, may contain, as substituents on the ring chain, alkyl, cycloalkyl, arylalkyl, alkoxy, hydroxy, carbalkoxy, carbonamido, dialkylaminoalkyl or perfluoroalkyl groups containing up to 8 carbon atoms.

All of the compounds included in the scope of this invention are insecticides and as a result of the presence of a tertiary carbamyl group, possess novel physical and chemical properties. In addition, some of the compounds of this invention have valuable analgesic properties which as shown by standard tests are for many of the compounds superior to that of morphine. These constitute a particularly preferred embodiment of this invention and can be represented by Formula I wherein:

X is oxygen or sulfur;
$R^1$ is methyl;
$R^2$ has no more than 8 carbons, preferably no more than 6, and is alkyl, alkenyl, alkoxyalkyl, hydroxyalkyl, methylalkylamino, alkylaminoalkyl, dialkylaminoalkyl, carboxyalkyl, carbalkoxyalkyl (—alkyl—COO—alkyl), carbonamidoalkyl or cyanoalkyl;
$R^1$ and $R^2$ joined together form, with the carbamyl nitrogen, the heterocyclic ring structures

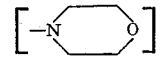

morpholino

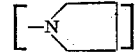

pyrrolidyl

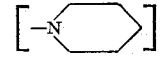

piperidyl
dehydropiperidyl

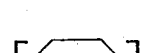

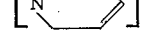

azabicyclononyl

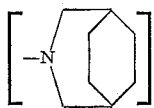

and substituted piperidine of the formula

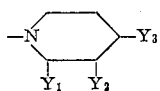

wherein only one of the Y's is other than hydrogen and selected such that—
  $Y_1$ is H or $CH_3$,
  $Y_2$ is H, $CH_3$, $C_2H_5$, or $COOR^5$ where $R^5$ is an alkyl of 1 to 4 carbons,
  $Y_3$ is H, OH, alkyl of 1–4 carbons, cycloalkylalkyl of 4–9 carbons, hydroxyalkyl of 2–9 carbons, alkoxyalkyl of 3–9 carbons, trifluoromethyl, carbalkoxy ($COOR^5$), carbonamido having up to two 1–4 carbon alkyls attached to amide nitrogen, dialkylaminoalkyl where each alkyl of the dialkyl portion has up to 2 carbons and the remaining alkyl up to 4 carbons, pyrrolidinomethyl and arylalkyl of 7 through 9 carbons,
  or if two Y's are other than hydrogen, $Y_1$ is H and $Y_2$ and $Y_3$ substituents are selected from the above.
$R^3$ is hydrogen, alkyl, trifluoromethyl, fluorine, chlorine, bromine, pyridyl, or alkylmercapto, and
$R^4$ is hydrogen, alkyl, trifluoromethyl, fluorine, chlorine, bromine; when X is sulfur or when $R^3$ is other than methyl, then $R^4$ must be hydrogen.

Particularly preferred as analgesics or 1,2,4-triazoles of the structure

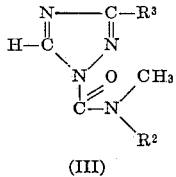

(III)

i.e., where $R^4$ is hydrogen; $R^1$ is methyl; X is oxygen; and $R^3$ is hydrogen, methyl or pyridyl; and $R^2$ is of up to 4 carbons and is alkenyl, methylalkylamino, or alkyl wherein the carbon joined to the carbamyl nitrogen is a primary or secondary carbon atom.

Another preferred class of analgesics are the piperidyl carbonyl 1,2,4-triazoles of the structure

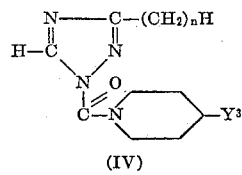

(IV)

i.e., where $Y^3$ is hydrogen or lower alkyl (1–4 carbons) and $n$ is 0 or 1.

The new substituted triazoles can be prepared by reaction of the aforementioned triazole having hydrogen on nuclear nitrogen with an N-disubstituted carbamyl halide, preferably the chloride. This reaction takes place readily, particularly in the presence of an acid acceptor, such as a tertiary amine. An alternative technique involves conversion of the triazole to the corresponding alkali metal salt, e.g., by treatment with an alkali metal, hydride, amide, or alkoxide before reaction with the carbamyl halide.

An additional method involves reaction of the triazole with phosgene to give the corresponding triazole carbonyl halide. The latter compound upon reaction with an excess of a secondary amine gives the N-disubstituted carbamyltriazoles.

By use of thiocarbamyl chloride or thiophosgene, the corresponding thiocarbamyl compounds are obtained.

The following examples further illustrate the new compounds of this invention and their preparation.

EXAMPLE I

*1-N,N-dimethylcarbamyl-1,2,4-triazole*

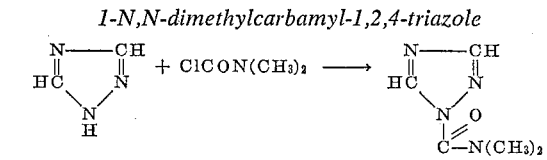

A mixture of 20.7 g. of 1,2,4-triazole, 35.3 g. of dimethylcarbamyl chloride, 33.3 g. of triethylamine, and 250 ml. of tetrahydrofuran was heated under reflux for 20 hours. The mixture was allowed to cool and the solid triethylamine hydrochloride that had precipitated was removed by filtration and washed with ether. The combined filtrate and washings were freed of solvent by distillation. The oil that remained was distilled and the fraction boiling from 60–81°/0.6 mm. was collected. This distillate was redistilled through a 12-inch Vigreux column to give 19.9 g. (47%) of 1-dimethylcarbamyl-1,2,4-triazole, B.P. 78°/0.9 mm.

*Analysis.*—Calcd. for $C_5H_8N_4O$: C, 42.8; H, 5.76; N, 40.0. Found: C, 42.5; H, 6.05; N, 39.8.

A quaternary salt of the above can be prepared as follows: A solution of 50 ml. of acetone, 50 ml. of ether, 10 g. of 1-dimethylcarbamyl-1,2,4-triazole, and 10 ml. of methyl iodide was allowed to stand at room temperature for six days. The yellow crystals that had formed were removed by filtration. There was obtained 2.21 g. (M.P. 142–149° C. with decomposition). There was isolated from the filtrate 0.04 g. of product by adding ethyl acetate. The crystalline product was recrystallized from ethanol and ethyl acetate mixture to give 2.1 g. of the methyl iodide quaternary salt of 1-N,N-dimethylcarbamyl-1,2,4-triazole, M.P. 159–161.5° C. with decomposition to a red oil.

*Analysis.*—Calcd. for $C_6H_{11}N_4IO$: C, 25.5; H, 3.9; N, 19.9; I, 45.0. Found: C, 25.70; H, 3.99; N, 20.04; I, 43.71.

The infrared spectrum showed absorptions at 3.32μ (C—H), 5.7μ (C=O), 6.28μ and 6.4μ (conjugated cyclic C=C and/or C=N).

EXAMPLE II

*1-N,N-dimethylcarbamyl-3(5)-methyl-5(3)-methylmercapto-1,2,4-triazole*

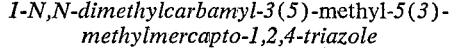

and

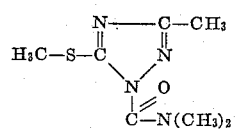

To a suspension of 5.4 g. of 53.5% sodium hydride in mineral oil in 100 ml. of dry tetrahydrofuran was added a solution of 14.3 g. of 3(5)-methyl-5(3)-methylmercapto-1,2,4-triazole in 150 ml. of dry tetrahydrofuran at 30–35° C. The reaction mixture was refluxed for one hour. After cooling to room temperature, 12.9 g. of dimethylcarbamyl chloride was added at 30–35° C. The reaction mixture was refluxed for four hours, the solid sodium chloride removed by filtration, and then the solvent was removed by distillation at atmospheric pressure. The residue was dissolved in a 50/50 ether/pentane mixture, which deposited crystals upon cooling to −80° C. Filtration gave 20.5 g. of 1-N,N-dimethylcarbamyl - 3(5) - methyl-5(3)-methylmercapto-1,2,4-triazole, M.P. 59–72° C. (93% yield). The product was probably a mixture of the two isomers.

*Analysis.*—Calcd. for $C_7H_{12}N_4OS$: C, 42.0; H, 6.04; N, 28.0; S, 16.0. Found: C, 42.1; H, 6.08; N, 26.7; S, 15.4.

EXAMPLE III

*1-N,N-dimethylcarbamyl-3-methyl-1,2,4-triazole*

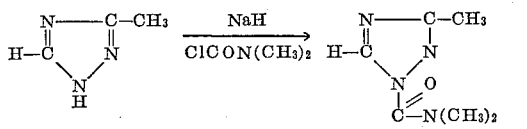

To a solution of 24.5 g. of 3-methyl-1,2,4-triazole in 250 ml. of dry tetrahydrofuran was added with stirring 14.4 g. of 53.5% sodium hydride in mineral oil in small portions. The resulting mixture was refluxed for one hour and then allowed to cool to room temperature. To the stirred suspension was added 34.4 g. of dimethylcarbamyl chloride in 50 ml. of dry tetrahydrofuran over a period of 0.5 hour at 30° C. After refluxing the mixture for four hours, solid sodium chloride was removed by filtration. The solvent was removed from the filtrate by distillation. The residue was then distilled under reduced presure through a 20 cm. glass helices-packed still. There was obtained 36.9 g. of 1-N,N-dimethylcarbamyl-3-methyl-1,2,4-triazole, B.P. 78° C. at 1 mm.; $n_D^{25}$, 1.4975 (80% yield).

*Analysis.*—Calcd. for $C_6H_{10}N_4O$: C, 46.7; H, 6.5; N, 36.3. Found: C, 47.4; H, 6.6; N, 35.5.

EXAMPLE IV

*1-N,N-dimethylthiocarbamyl-1,2,4-triazole*

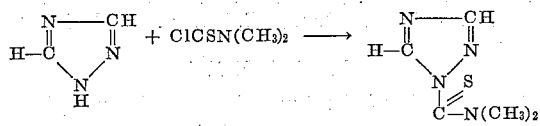

To a solution of 14 g. of 1,2,4-triazole and 29.6 g. of N,N-dimethylthiocarbamyl chloride in 100 ml. of dry tetrahydrofuran was added 24.2 g. of triethylamine. After refluxing for an hour, the reaction mixture stood at room temperature for 15 hours and was then refluxed for 5.5 hours. Triethylamine hydrochloride precipitate (25 g.) was removed by filtration and the solvent evaporated from the filtrate. The residue was crystallized from dilute methanol to give 14.5 g. of crude 1-N,N-dimethylthiocarbamyl - 1,2,4 - triazole, M.P. 69–79°, which after two crystallizations from benzene/petroleum ether (B.P. 30–60°) gave white needles of the compound, M.P. 84–85° C.

*Analysis.*—Calcd. for $C_5H_8N_4S$: N, 35.90; S, 20.51. Found: N, 36.06, 35.70; S, 20.56.

EXAMPLE V

*1-N,N-dimethylcarbamyl-3(5)-methyl-5(3)-methylsulfonyl-1,2,4-triazole*

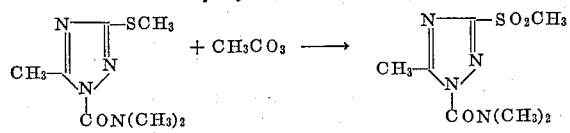

To a stirred solution of 10 g. of 1-dimethylcarbamyl-3(5)-methyl-5(3)-methylmercapto-1,2,4-triazole in 50 ml. of glacial acetic acid heated at 70° C. was added 19 g. of 40% peracetic acid in acetic acid at a rate to maintain the temperature at 68–72° C. The solution was then stirred 14 hours at 73° C. The solvent was removed under reduced pressure in a rotating evaporator and the residue crystallized from isopropyl alcohol. There was obtained 10.2 g. (88%) of 1-dimethylcarbamyl-3(5)-methyl - 5(3) - methylsulfonyl - 1,2,4 - triazole, M.P. 90–91° C. Infrared spectrum shows C=O at 5.8μ, $SO_2$ at 7.6μ and 8.7μ confirming the assigned structure.

EXAMPLE VI

*1-N,N-dimethylcarbamyl-3(5)-methyl-5(3)-methylsulfonyl-1,2,4-triazole*

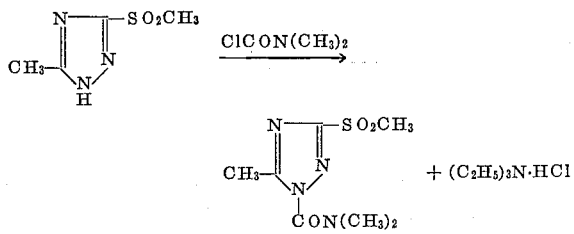

A mixture of 8.1 g. (0.05 mole) of 3(5)-methyl-5(3)-methylsulfonyl-1,2,4-triazole, 5.4 g. (0.05 mole) of dimethylcarbamyl chloride, 5.1 g. (0.05 mole) of triethylamine and 60 ml. of tetrahydrofuran was refluxed for 24 hours. The solid ammonium chloride was removed by filtration to give 6.7 g. of triethylamine hydrochloride (theory 6.9 g.). About 5 ml. of ether was added to the refluxing filtrate and the resulting solution put into an ice water bath. A small amount of crystals (about .5 g.) was removed by filtration and identified as starting material. The solvent was removed from the filtrate and the residue was crystallized from isopropyl alcohol to give 6.2 g. (53%) of 1-dimethylcarbamyl-3(5)-methyl-5(3)-methylsulfonyl-1,2,4-triazole, M.P. 90–91.5° C. The infrared spectrum was identical to that of the product of the preceding example.

The starting sulfonyl compound for the above was made as follows:

To a stirred mixture of 23.2 g. of 5(3)-methyl-3(5)-methylmercapto-1,2,4-triazole in 100 ml. of glacial acetic acid at 70° C. was added carefully 68.5 g. of 40% peracetic acid in acetic acid at 68–72° C. The mixture was stirred and heated at 70° C. for four hours, the solvent removed under reduced pressure, and the residue crystallized from ethanol. There was obtained 26.4 g. (91%) of 5(3)-methyl-3(5)-methylsulfonyl-1,2,4-triazole, M.P. 181–181.5° C.

*Analysis.*—Calcd. for $C_4H_7N_3SO_2$: C, 29.8; H, 4.4; N, 26.1; S, 19.9. Found: C, 30.01; H, 4.35; N, 26.15, 26.35; S, 19.6.

The infrared spectrum showed —$SO_2$— at 7.6μ and 8.75μ.

EXAMPLE VII

*1-N,N-diethylcarbamyl-3(5)-methylmercapto-5(3)-methyl-1,2,4-triazole*

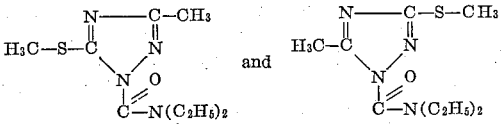

A solution of 25.8 g. of 3(5)-methylmercapto-5(3)-methyl-1,2,4-triazole (see Example II) in 300 ml. of tetrahydrofuran was stirred at room temperature while adding portionwise, 9 g. of 53.5% sodium hydride in mineral oil. The mixture was refluxed for one hour, then cooled to room temperature and 28.2 parts of N,N-diethylcarbamyl chloride dropped in over a 30-minute period. The reaction mixture was refluxed for two hours. The solvent was evaporated in vacuum. The residue was extracted with petroleum ether to remove mineral oil and the product distilled at 121–129° at 0.05 mm. This yielded 26.3 g. (52%) of 1-diethylcarbamyl-3(5)-methylmercapto-5(3)-methyl-1,2,4-triazole, $n_D^{25}$ 1.5187.

*Analysis.*—Calcd. for C₉H₁₆N₄OS: C, 47.35; H, 7.06; N, 24.55; S, 14.04. Found: C, 49.11; H, 7.57; N, 24.36; S, 13.59.

EXAMPLE VIII

*1-N-n-butyl-N-methylcarbamyl-3(5)-methylmercapto-5(3)-methyl-1,2,4-triazole*

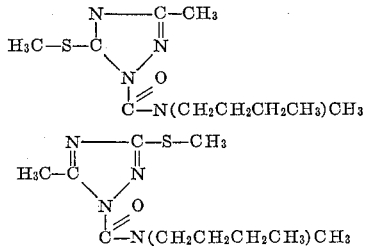

and

A solution of 25.8 g. of 3(5)-methylmercapto-5(3)-methyl-1,2,4-triazole in 400 ml. of tetrahydrofuran was stirred at room temperature during portionwise addition of 9 g. of 53.5% sodium hydride in mineral oil over a period of 40 minutes. The mixture was then refluxed for one hour, cooled to 50° and 29.8 g. of N-methyl-N-n-butylcarbamyl chloride added over a 30-minute period followed by refluxing for five hours. The solvent was removed by vacuum distillation and the residue extracted with petroleum ether to remove mineral oil. Distillation at 121–125°/0.08 mm. yielded 26 g. (56%) of 1-methyl-n-butylcarbamyl-3(5)-methylthio-5(3)-methyl - 1,2,4-triazole, $n_D^{25}$ 1.5189.

*Analysis.*—Calcd. for C₁₀H₁₈N₄OS: C, 49.60; H, 7.49; N, 23.12; S, 13.23. Found: C, 50.58; H, 7.79; N, 23.71; S, 13.17.

EXAMPLE IX

*1-(N,N-tetramethylenecarbamyl)-3(5)-methylmercapto-5(3)-methyl-1,2,4-triazole*

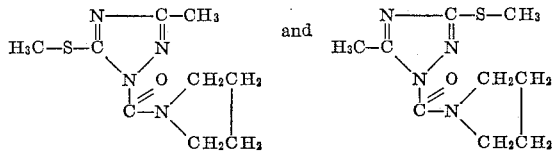

A solution of 11.1 g. of 3(5)-methylmercapto-5(3)-methyl-1,2,4-triazole in 300 ml. of tetrahydrofuran was stirred at room temperature while 3.9 g. of a 53.5% mixture of sodium hydride in mineral oil was added in small portions under anhydrous conditions. The reaction mixture was stirred for 20 minutes, then heated to reflux for one hour and cooled to room temperature. The mixture was stirred at room temperature while dropping in 11.5 g. of N-pyrrolidinecarbonyl chloride. The mixture was stirred an additional 30 minutes at room temperature, then refluxed for two hours. After standing overnight, the solvent was removed by vacuum distillation. The mineral oil was extracted with petroleum ether and the residue was distilled at 0.05 mm. pressure in a short-path still. This yielded 11.7 g. (60%) of 1-(N,N-tetramethylenecarbamyl - 3(5) - methylmercapto - 5(3) - methyl-1,2, 4-triazole, B.P. 126–131°/0.05 mm.

*Analysis.*—Calcd. for C₉H₁₄N₄OS: C, 47.77; H, 5.76; N, 24.76; S, 14.17. Found: C, 47.78; H, 6.09; N, 24.46; S, 14.39.

EXAMPLE X

*1-N,N-dimethylcarbamyl-3(5)-ethylmercapto-5-(3)-methyl-1,2,4-triazole*

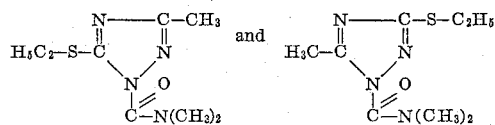

A solution of 38.8 g. of 3(5)-ethylmercapto-5(3)-methyl-1,2,4-triazole in 400 ml. of tetrahydrofuran was treated by the portionwise addition of 12.2 g. of 53.5% sodium hydride in mineral oil as described in Example IX. The mixture was heated to reflux for one hour and cooled to room temperature. The reaction mixture was stirred at room temperature while dropping in 29.2 g. of dimethyl carbamyl chloride. The mixture was then heated for one hour and allowed to stand overnight, after which the solvent was removed under reduced pressure. The solid residue was extracted with alcohol, the solvent evaporated and the residue extracted with petroleum ether to remove mineral oil. The product was distilled at low pressure in a short-path still. This yielded 25.5 g. of 1-N,N-dimethylcarbamyl-3(5)-ethylmercapto - 5(3) - methyl-1,2,4-triazole, B.P. 110–115°/0.03 mm.

*Analysis.*—Calcd. for C₈H₁₄N₄OS: N, 26.14; S, 14.96. Found: N, 26.10; S, 15.71.

EXAMPLE XI

*1,N,N-dimethylcarbamyl-3-chloro-1,2,4-triazole*

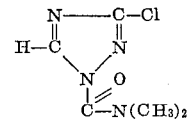

A solution of 15.8 g. of 3(5)-chloro-1,2,4-triazole in 300 ml. of tetrahydrofuran was converted to the sodio derivative as in Example IX by treatment with 6.8 g. of sodium hydride in mineral oil. The reaction mixture was cooled to room temperature and treated with 16.5 g. of dimethylcarbamyl chloride, following which the reaction mixture was heated to reflux for two hours. After standing overnight, the solvent was removed by vacuum distillation and the semisolid residue triturated with a small amount of cyclohexane to remove the mineral oil and induce crystallization. The crystalline product was filtered from the cyclohexane-mineral oil and recrystallized from ethyl alcohol. This yielded 14 g. (52.4%) of 1-N,N-dimethylcarbamyl-3-chloro-1,2,4-trizole, M.P. 63–64° C.

*Analysis.*—Calcd. for C₅H₇ClN₄O: C, 34.49; H, 4.04; Cl, 20.31; N, 32.09. Found: C, 34.76; H, 4.37; Cl, 20.52; N, 33.55.

EXAMPLE XII

*1-N,N-dimethylcarbamyl-3-hendecyl-5-methylmercapto-1,2,4-triazole*

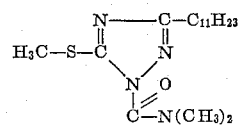

A solution of 28.8 g. of 3-hendecyl-5-methylmercapto-1,2,4-triazole in 300 ml. of tetrahydrofuran was converted to the sodium derivative as in Example IX by treatment with 4.8 g. of sodium hydride in mineral oil. The cooled suspension of sodio derivative was stirred at room temperature while dropping in 11.5 g. of dimethylcarbamyl chloride over a period of about 30 minutes. The reaction mixture was then refluxed for two hours and allowed to stand overnight. The solvent was distilled in vacuum and the residue treated with a small amount of cyclohexane to remove the mineral oil. The solid residue was then recrystallized from ethanol. This yielded 17 g. of 1-N,N-dimethylcarbamyl-3-hendecyl-5-methylmercapto-1,2,4-triazole, boiling at 126–198° at between 0.15 and 0.58 mm.

*Analysis.*—Calcd. for C₁₇H₃₁N₄OS: N, 16.51. Found: N, 16.77.

The infrared spectrum showed absorption at 3.3μ (C—H), 5.75μ (C=O), and 6.8μ (conjugated cyclic C=C and/or C=N).

The 3-hendecyl-5-methylmercapto-1,2,4-triazole used in the preceding preparation was prepared as follows:

(A) A solution of 28.3 g. of thiosemicarbazide in 80 ml. of pyridine and 170 ml. of water was stirred in an ice bath while dropping in 65.6 g. of lauroyl chloride at such a rate as to maintain the temperature at about 10° C. This mixture was allowed to warm to room temperature and refluxed for two hours. The solvent was then distilled at the water pump and 200 ml. of reagent-grade methanol was added, followed by the addition of 40.5 g. of commercial sodium methoxide. This mixture was refluxed for six hours, after which the solvent was evaporated in vacuum. The residue was dissolved in water, filtered, and made strongly acid with hydrochloric acid. After standing overnight, the crude 3-hendecyl-5-mercapto-1,2,4-triazole was filtered, washed thoroughly with cold water and crystallized from ethanol. This yields 35 g. (46%) of 3-hendecyl-5-mercapto-1,2,4-triazole, M.P. 181–182° C.

*Analysis.*—Calcd. for $C_{13}H_{25}N_3S$: C, 61.13; H, 9.86; N, 16.46. Found: C, 60.91; H, 9.84; N, 15.66.

(B) The 3-hendecyl-5-mercapto-1,2,4-triazole in the preceding paragraph was methylated as follows. A mixture of 4.4 g. of sodium hydroxide, 300 ml. of water, and 29.8 g. of 3-hendecyl-5-mercapto-1,2,4-triazole was heated to 70° C. and stirred while adding 12.6 g. of dimethyl sulfate over a 30-minute period. The mixture was stirred and heated at 70° C. for an additional hour and then allowed to stand overnight. The mixture was strongly acidified and extracted for 24 hours with ether in a continuous extractor. The ether was evaporated and the residue crystallized from alcohol. This yielded 16.4 g. of 3-hendecyl-5-methylmercapto-1,2,4-triazole, M.P. 70–72° C. Additional product was recovered from 12.4 g. of low melting material obtained by evaporation of the mother liquor.

*Analysis.*—Calcd. for $C_{14}H_{27}N_3S$: S, 11.90. Found: S, 11.96.

EXAMPLE XIII

*1-N,N-dimethylcarbamyl-3-benzylmercapto-5-methyl-1,2,4-triazole*

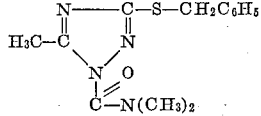

A solution of 58.5 g. of 3(5)-benzylmarcapto-5(3)-methyl-1,2,4-triazole in 500 ml. of tetrahydrofuran was treated with 12.8 g. of a mixture of sodium hydride (53.5%) in mineral oil as described in Example IX. The mixture was cooled, stirred at room temperature while dropping in 30.6 g. of dimethylcarbamyl chloride, after which the mixture was refluxed for 5 hours. The mixture was allowed to stand overnight and the solvent removed by the vacuum distillation. The solid residue was extracted with chloroform and the chloroform evaporated. The residue was extracted with petroleum ether to remove mineral oil and the product was distilled. There was obtained 57.7 g. of 1-N,N-dimethylcarbamyl-3-benzyl-mercapto-5-methyl-1,2,4-triazole, B.P. 165–170°/0.04 mm.

*Analysis.*—Calcd. for $C_{13}H_{16}N_4OS$: C, 56.49; H, 5.83; N, 20.27; S, 11.61. Found: C, 57.04; H, 5.92; N, 19.45; S, 11.75.

EXAMPLE XIV

*1-N,N-dimethylcarbamyl-3-(3',4',5'-trimethoxyphenyl)-methylmercapto-1,2,4-(1H)-triazole*

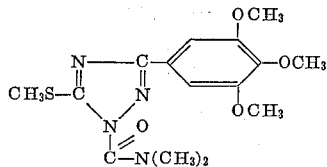

A solution of 52 parts of 3-(3',4',5'-trimethoxyphenyl)-5-methylmercapto-1,2,4-(1H)-triazole in 1000 parts of anhydrous, peroxide-free tetrahydrofuran was stirred at room temperature while 8 parts of 53.5% sodium hydride in mineral oil was added in small portions. The mixture was heated to reflux for one hour and then cooled to room temperature. Next, 20 parts of dimethylcarbamyl chloride was dropped into the reaction mixture, following which the mixture was stirred for one hour, then stirred and heated to reflux for five hours. The solvent was then evaporated and the residue crystallized from ethanol to yield 30 parts of 1-N,N-dimethylcarbamyl-3-(3',4',5'-trimethoxyphenyl) - 5 - methylmercapto-1,2,4-(1H)-triazole melting at 135.5–136°.

*Analysis.*—Calcd. for $C_{15}H_{20}N_4O_4S$: C, 51.12; H, 5.73; N, 15.90. Found: C, 51.29; H, 5.74; N, 16.28.

The 3-(3',4',5'-trimethoxyphenyl)-1,2,4-(1H)-triazole-3(5)-thiol was prepared by a reaction analogous to that of Example 14 using 3,4,5-trimethoxybenzoyl chloride and thiosemicarbazide. The product melted at 303–304°.

*Analysis.*—Calcd. for $C_{11}H_{13}N_3O_3S$: C, 49.42; H, 4.91; N, 15.72; S, 11.99. Found: C, 49.72; H, 5.14; N, 15.66; S, 11.55.

The above triazolethiol was methylated as in Example 14 to give 3-(3',4',5'-trimethoxyphenyl)-5-methyl-mercapto-1,2,4-(1H)-triazole melting at 155.5–156°.

*Analysis.*—Calcd. for $C_{12}H_{15}N_3O_3S$: C, 51.23; H, 5.38; N, 14.94. Found: C, 51.85; H, 5.44; N, 15.45.

EXAMPLE XV

*1-N,N-dimethylcarbamyl-3-phenyl-5-methylmercapto-1,2,4-(1H)-triazole*

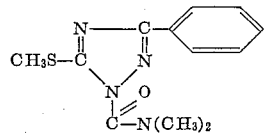

A solution of 12 parts of 3-phenyl-5-methylmercapto-1,2,4-(1H)-triazole in 200 parts of anhydrous, peroxide-free tetrahydrofuran was stirred at room temperature while adding 2.8 parts of 53.5% sodium hydride in mineral oil in small portions. The mixture was then refluxed for one hour and cooled to room temperature. Next, 6.8 parts of dimethylcarbamyl chloride was dropped in over a 30-minute period, following which the mixture was refluxed for 6.5 hours. The solvent was evaporated and the product crystallized from chloroform/cyclohexane and recrystallized from cyclohexane to give 6.8 parts of 1 - N,N - dimethylcarbamyl - 3 - phenyl - 5 - methylmercapto-1,2,4-(1H)-triazole melting at 106–107°.

*Analysis.*—Calcd. for $C_{12}H_{14}N_4OS$: C, 55.81; H, 5.47; N, 21.69. Found: C, 56.09; H, 5.36; N, 21.82.

3-phenyl-1,2,4-(1H)-triazole-5-thiol was methylated as in Example 14 to give 3-phenyl-5-methylmercapto-1,2,4-(1H)-triazole melting at 163–164°.

*Analysis.*—Calcd. for $C_9H_9N_3S$: C, 56.52; H, 4.75; S, 16.77. Found: C, 55.70; H, 4.66; S, 16.55.

By using the general method of Example XV, 1-N,N-dimethylcarbamyl - 3 - p - methoxyphenyl - 5 - methylmercapto-1,2,4-(1H)-triazole was prepared from 3-p-methoxyphenyl-5-methylmercapto-1,2,4-(1H)-triazole.

EXAMPLE XVI

*1-N,N-dimethylcarbamyl-3(5)-ethyl-5(3)-methylmercapto-1,2,4-triazole*

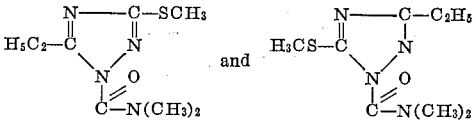

When the general procedure of Example II was repeated except that 3(5)-ethyl-5(3)-methylmercapto-1,2,4-triazole was used in place of the 3(5)-methylmercapto-1,2,4-triazole, there was obtained the 1-dimethylcarbamyl-3(5)-ethyl-5(3)-methylmercapto-1,2,4-triazole as a liquid which was distilled in a molecular still (bath temperature of 120° at 0.07 mm.).

Analysis.—Calcd. for C₈H₁₄N₄OS: C, 44.83; H, 6.58; N, 26.14; S, 14.96. Found: C, 45.54; H, 6.65; N, 26.79; S, 14.92.

The methylmercaptotriazole used above was prepared by reaction of 3(5)-mercapto-5(3)-ethyl-1,2,4-triazole with methyl sulfate.

EXAMPLE XVII

*1-N,N-dimethylcarbamyl-3-methylmercapto-1,2,4-triazole*

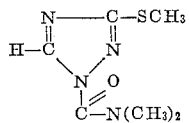

Repetition of the general procedure of Example II except that 3-methylmercapto-1,2,4-triazole (by methylation of mercaptotriazole) was used gave 1-dimethylcarbamyl-3-methylmercapto-1,2,4-triazole, B.P. 108°/0.05 mm., $n_D^{27.5}$ 1.5483.

Analysis.—Calcd. for C₆H₁₀N₄OS: C, 38.69; H, 5.41; N, 30.08; S, 17.22. Found: C, 39.84; H, 5.87; N, 30.10; S, 17.47.

EXAMPLE XVIII

*1,N,N-dimethylcarbamyl-3-bromo-1,2,4-triazole*

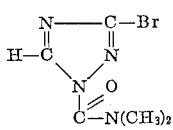

The general process of Example XI was repeated except that 3-bromo-1,2,4-triazole was employed. There was obtained 37% yield of 1-dimethylcarbamyl-3-bromo-1,2,4-triazole, M.P. 93–94° C.

Analysis.—Calcd. for C₅H₇BrN₄O: C, 27.93; H, 3.28; Br, 37.17. Found: C, 27.74; H, 3.31; Br, 37.64.

EXAMPLE XIX

*1-N,N-dimethylcarbamyl-3,5-dichloro-1,2,4-triazole*

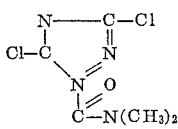

To sodium hydride (9.7 g. of 53.5% in mineral oil) in 300 ml. of tetrahydrofuran was added 29.4 g. of 3,5-dichloro-1,2,4-triazole. After refluxing for an hour, 23.3 g. of dimethylcarbamyl chloride was added dropwise over a 30-minute period. After refluxing for five hours, the solvent was removed, residue extracted with petroleum ether and distilled. The 1-dimethylcarbamyl-3,5-dichloro-1,2,4-triazole boiled at 128–130°/0.05 mm. (15.1 g.) and had a M.P. of 53–55° C.

Analysis.—Calcd. for C₅H₆Cl₂N₄O: C, 28.73; H, 2.89; Cl, 33.93; N, 26.81. Found: C, 29.18; H, 3.11; Cl, 33.46; N, 26.10.

EXAMPLE XX

*1-N,N-dimethylcarbamyl-3-p-nitrophenylmercapto-5-methyl-1,2,4-triazole*

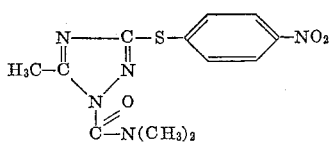

The general procedure of Example XIII was repeated except that 3-p-nitrophenylmercapto-5-methyl-1,2,4-triazole was used. The 1-dimethylcarbamyl-3-p-nitrophenylmercapto-5-methyl-1,2,4-triazole was recrystallized from alcohol, M.P. 116–117° C.

Analysis.—Calcd. for C₁₂H₁₃N₅O₃S: C, 46.89; H, 4.41; N, 22.79. Found: C, 47.59; H, 4.17; N, 22.54.

The triazole employed in the above reaction was obtained by reaction of 1-chloro-4-nitrobenzene with the potassium salt of 3-mercapto-5-methyl-1,2,4-triazole.

EXAMPLE XXI

*1-N,N-dimethylcarbamyl-3-β-diethylaminoethylmercapto-5-methyl-1,2,4-triazole*

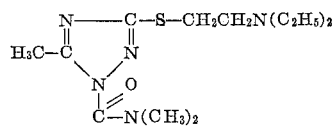

The general procedure of the Example II was repeated with 3-β-diethylaminoethylmercapto-5-methyl-1,2,4-triazole (obtained by reaction of β-diethylaminoethyl chloride with 3-mercapto-5-methyl-1,2,4-triazole). There was obtained 70% yield of 1-dimethylcarbamyl-3-β-diethylaminoethylmercapto-5-methyl-1,2,4-triazole as a liquid distilling at 150–170° C. (bath)/0.1 mm.

Analysis.—Calcd. for C₁₂H₂₃N₅OS: S, 11.24. Found: S, 10.71.

EXAMPLE XXII

*1-N,N-dimethylcarbamyl-3,5-dimethyl-1,2,4-triazole*

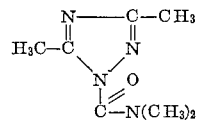

Repetition of the general procedure of Example III except that 3,5-dimethyl-1,2,4-triazole was used gave a 74.8% yield of 1-dimethylcarbamyl-3,5-dimethyl-1,2,4-triazole, which was crystallized from ethyl acetate and cyclohexane, M.P. 52–53.5° C.

Analysis.—Calcd. for C₇H₁₂N₄O: C, 49.98; H, 7.19; N, 33.35. Found: C, 50.25; H, 7.45; N, 33.95.

EXAMPLE XXIII

*1-N,N-dimethylthiocarbamyl-3(5)-methylmercapto-5(3)-methyl-1,2,4-triazole*

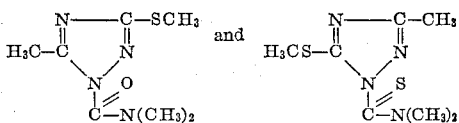

When the general procedure of Example IV was repeated except that 3(5)-methylmercapto-5(3)-methyl-1,2,4-triazole was used, there was obtained 11% yield of 1-dimethylthiocarbamyl - 3(5) - methylmercapto - 5(3)-methyl-1,2,4-triazole, the major part of which boiled at 120°/0.48 mm.

Analysis.—Calcd. for C₇H₁₂N₄S: S, 29.65. Found: S, 29.57.

EXAMPLE XXIV

*1-N,N-dimethylcarbamyl-3-difluoromethylmercapto-1,2,4-triazole*

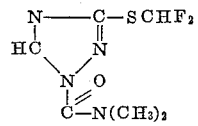

Following the general procedure of Example II, 3-difluoromethylmercapto-1,2,4-triazole was used to give a 78% yield of 1-dimethylcarbamyl-3-difluoromethylmercapto-1,2,4-triazole, B.P. 111–112° C./0.25 mm., $n_D^{25}$ 1.5050. The triazole used was prepared by reaction of 3-mercapto-1,2,4-triazole with chlorodifluoromethane in the presence of sodium hydroxide in a sealed tube.

EXAMPLE XXV

*1-N,N-dimethylcarbamyl-3-ethoxycarbonylmethylmercapto-5-methyl-1,2,4-triazole*

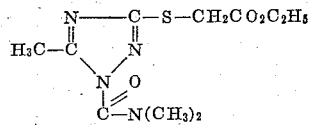

Twenty-eight grams of 3-ethoxycarbonylmethylmercapto-5-methyl-1,2,4-triazole was suspended in 500 ml. of tetrahydrofuran and stirred at room temperature while adding 6.2 g. of 53.5% sodium anhydride in mineral oil in small portions over a 30-minute period. The reaction mixture was stirred at room temperature for an additional one-half hour then heated to reflux with stirring for one hour. The mixture was cooled to room temperature and 14.9 g. of dimethylcarbamyl chloride dropped in over a 30-minute period. Stirring was continued for 40 minutes, after which the mixture was stirred and refluxed for six hours. The mixture was cooled, filtered from inorganic salt, and the filtrate evaporated to dryness. Crystallization of the solid residue from ethanol yielded 3.8 g. of 1-dimethylcarbamyl - 3 - ethoxycarbonylmethylmercapto - 5-methyl-1,2,4-triazole melting at 83–84°.

The infrared spectrum showed the carbonyl absorption at 17.30 cm.$^{-1}$ for the 1-dimethylcarbamyl group.

*Analysis.*—Calcd. for $C_{10}H_{16}N_4O_3S$: C, 44.1; H, 5.9; N, 20.6. Found: C, 44.1; H, 5.9; N, 20.7.

The triazole used above was obtained as follows: A solution of 38 g. of 5-methyl-1,2,4-triazole-3-thiol and 12.8 g. of sodium hydroxide in 500 ml. of water was heated to 70° and stirred while dropping in 38 g. of ethyl chloroacetate over a 30-minute period. After stirring and heating for four hours, the reaction mixture was evaporated on the steam bath and the solid residue extracted with hot benzene. The benzene extract was dried and allowed to crystallize. This gave 30 g. of 3-ethoxycarbonylmethylmercapto-5-methyl-1,2,4-triazole, melting at 95–96°.

*Analysis.*—Calcd. for $C_7H_{11}N_3O_2S$: C, 41.8; H, 5.5; N, 20.9. Found: C, 41.1; H, 5.3; N, 20.2.

EXAMPLE XXVI

*1-N,N-dimethylcarbamyl-3-dodecylmercapto-5-methyl-1,2,4-triazole*

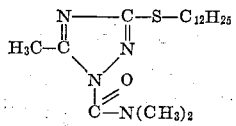

A solution of 38 parts of 3-dodecylmercapto-5-methyl-1,2,4-triazole in 500 parts of tetrahydrofuran was stirred at room temperature while adding, portionwise, 6.1 parts of a sodium hydride/mineral oil mixture containing 53.5% sodium hydride. The mixture was refluxed for 40 minutes, then cooled to room temperature. Next, 14.4 parts of dimethylcarbamyl chloride was dropped in over a 10-minute period, following which the mixture was refluxed for six hours. The mixture was evaporated to dryness and the product separated from sodium chloride by extraction with chloroform. The chloroform solution was concentrated and diluted with petroleum ether to induce crystallization. This yielded 25 parts of 1-dimethylcarbamyl-3-dodecylmercapto-5-methyl-1,2,4-triazole that melted at 57–58°.

*Analysis.*—Calcd. for $C_{18}H_{34}N_4OS$: C, 61.0; H, 9.7; N, 15.8; S, 8.3. Found: C, 61.5; H, 9.7; N, 15.1; S, 8.3.

The 3-dodecylmercapto-5-methyl-1,2,4-triazole used above was obtained by dissolving 28.8 parts of 5-methyl-3-mercapto-1,2,4-triazole in 500 parts of denatured alcohol containing 16.5 parts of potassium hydroxide and refluxing the mixture while dropping in 61 parts of dodecyl bromide over a 40-minute period. The mixture was stirred and heated at reflux for six hours. The product was extracted with chloroform in a continuous extractor. Evaporation of the chloroform gave an amorphous material that melted at 98–99° C.

*Analysis.*—Calcd. for $C_{15}H_{29}N_3S$: N, 14.8. Found: N, 13.9.

EXAMPLE XXVII

*1-N,N-dimethylcarbamyl-3-(4-pyridyl)-1,2,4-triazole*

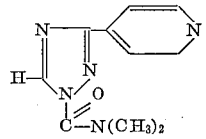

A mixture of 8.8 parts of isonicotinic hydrazide and 4.9 parts of thiourea was heated in an oil bath to a temperature of 175°. Gas evolved and heating was continued for ½ hour until gas evolution ceased. The pasty mass was cooled and treated with 90 parts by volume of absolute alcohol. The mixture was stirred and heated to boiling, then cooled in ice, and the solid product collected. There was obtained 4.8 parts of 3-(4-pyridyl)-5-mercapto-1,2,4-triazole melting at 307.5–312°.

A mixture of 4.7 parts of this 1,2,4-triazole, 25 parts of Raney nickel and 50 parts of absolute alcohol was stirred and heated under reflux for 16 hours. The mixture was filtered while still hot and the solid washed with 200 parts of alcohol. The combined filtrate and washing was concentrated to about 15 parts by volume and allowed to crystallize. The product, 1.3 parts of 3-(4-pyridyl)-1,2,4-triazole, formed needless melting at 226.2–227°.

*Analysis.*—Calcd. for $C_7H_6N_4$: C, 57.6; H, 4.14; N, 38.3. Found: C, 57.46; H, 4.20; N, 38.25.

One part of the above 3-(4-pyridyl)-1,2,4-triazole was converted to the sodium salt by reaction with sodium hydride in tetrahydrofuran as in Example III, followed by treatment with 0.75 part of dimethylcarbamyl chloride. This reaction mixture was heated under reflux in tetrahydrofuran for 77 hours. The reaction mixture was filtered and the solid washed with 25 parts of tetrahydrofuran. The tetrahydrofuran was removed on a steam bath and the residual oil triturated with petroleum ether. The crystalline solid was then extracted with boiling benzene, the benzene solution filtered hot, and concentrated to incipient crystallization. The hot solution was diluted with cyclohexane and further concentrated. Recrystallization yielded 0.68 part of 1-dimethylcarbamyl-3-(4-pyridyl)-1,2,4-triazole melting at 93–94.7°. Recrystallization raises the melting point to 98.7° with slight softening at 96.6°. Crystallization yielded material melting at 99.7–100.4°.

*Analysis.*—Calcd. for $C_{10}H_{11}N_5O$: C, 55.3; H, 5.11; N, 32.4. Found: C, 55.46; H, 5.10; N, 32.6.

EXAMPLE XXVIII

*Bis[3-(1-N,N-dimethylcarbamyl)-1,2,4-triazolyl] disulfide*

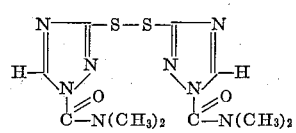

To a mixture of 25 parts of 3(5)-mercapto-1,2,4-triazole and 200 parts by volume of water was added a solution of 17 parts of 30% hydrogen peroxide in 50 parts of water over a ½ hour period. The mixture was stirred for an additional ½ hour and then cooled in ice. The solid product was collected and dried in vacuo to yield 23.9 parts of bis-3(1,2,4-triazole)disulfide melting at 214–214.8°.

A mixture of 20 parts of the disulfide, 9.5 parts of 53% sodium hydride dispersion, and 23.5 parts of dimethylcarbamyl chloride was heated under reflux for 3 hours in 250 parts by volume of glycol dimethyl ether. The reaction mixture was cooled, filtered, and the solid washed with 100 parts by volume of glycol dimethyl ether. The filtrate and wash liquid were combined and concentrated to about 75 parts by volume. The solution was diluted with 100 parts by volume petroleum ether and the oil that separated crystallized. The crude product was recrystallized from a mixture of alcohol and cyclohexane to give 25.3 parts of bis-3(1-dimethylcarbamyl)-1,2,4-triazole disulfide melting at 103–104.5°. Recrystallization of a sample for analysis raised the melting point to 104.8–105.2°.

*Analysis.*—Calcd. for $C_{10}H_{14}N_8S_2O_2$: C, 35.1; H, 4.12; N, 32.8. Found: C, 35.58; H, 4.25; N, 32.86.

EXAMPLE XXIX

*1-N,N-dimethylcarbamyl-3-mercapto-1,2,4-triazole*

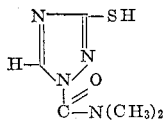

A suspension of 17.1 parts of the disulfide of the preceding example was suspended in 500 parts by volume of ether and 30 parts by volume of water. To this was added an aluminum amalgam prepared by dipping aluminum (10 parts) in 200 parts of mercuric chloride solution and washing with water. The mixture was stirred vigorously and refluxed for ½ hour. The ether layer was decanted from the aqueous paste of alumina which was washed with an additional 200 parts by volume of ether. The ether solution was combined and evaporated to dryness. The crude product, 1-dimethylcarbamyl-3-mercapto-1,2,4-triazole, weighed 2.8 parts. Purification by crystallization from benzene followed by sublimation at 110°/0.1 mm. yielded 1-N,N-dimethylcarbamyl-3-mercapto-1,2,4-triazole, M.P. 117.2–119.8°.

*Analysis.*—Calcd. for $C_5H_8N_4SO$: C, 34.9; H, 4.68; N, 32.6. Found: C, 35.09; H, 4.8; N, 32.5.

EXAMPLE XXX

*1-(4-n-propylpiperidinocarbonyl)-1,2,4-triazole*

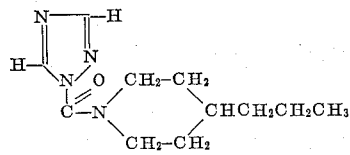

A solution of 6.9 g. of 1,2,4-triazole, 200 ml. of benzene, 10.1 g. of triethylamine, and 20.5 g. of 4-n-propylpiperidinocarbonyl chloride was stirred for about 66 hours, then washed with 100 ml. of water to remove triethylamine hydrochloride. The benzene layer was dried and benzene removed by evaporation. The residue was distilled, giving 1-(4-n-propylpiperidinocarbonyl)-1,2,4-triazole, boiling at 155–157° C./2.5 mm.; $n_D^{25}$, 1.5089.

*Analysis.*—Calcd. for $C_{11}H_{18}N_4O$: C, 59.4; H, 8.2; N, 25.2. Found: C, 59.2; H, 8.2; N, 24.7.

EXAMPLE XXXI

*1-(4-methylpiperidinocarbonyl)-1,2,4-triazole*

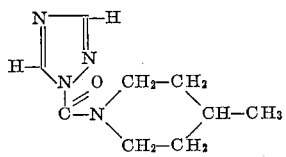

The general procedure of the preceding example was repeated except that an equivalent amount of 4-methylpiperidinocarbonyl chloride was used in place of 4-n-propylpiperidinocarbonyl chloride. The 1 - (4-methylpiperidinocarbonyl)-1,2,4-triazole obtained boiled at 93–95° C./0.3 mm. and had $n_D^{25}$ of 1.5134.

*Analysis.*—Calcd. for $C_9H_{14}N_4O$: C, 55.6; H, 7.3; N, 28.8. Found: C, 56.6; H, 7.6; N, 28.6.

The triazoles used in the processes yielding the new tertiary carbamyl derivatives on nuclear nitrogen are available as generally described in the chemical literature. Reaction of a triazole having hydrogen on nuclear nitrogen with an N,N-saturated dialiphatically substituted carbamyl (also named carbamoyl) halide takes place readily. Although the halogen can be the bromide, it is preferred that the chloride be used since this derivative is cheaper and more readily available. This reaction results in the production of hydrogen halide and an acid acceptor, preferably a tertiary amine or sodium hydride should be present to remove this product. An alternative method as illustrated in the examples involves the use of an alkali metal hydride on the hydrogen-bearing triazole to give the corresponding alkali metal salt, which then reacts with the carbamyl halide to yield the desired N,N-disubstituted carbamyl triazole.

A further method involves the preparation of a triazole having a carbonyl halide on nuclear nitrogen. According to this process, phosgene is reacted with a triazole having hydrogen on nuclear nitrogen and the corresponding triazole carbonyl chloride is treated with a saturated aliphatic secondary amine to give the desired N-disubstituted carbamyl triazole.

These reactions proceed under normal conditions, e.g., at temperatures of 0–100° C. and times of a few minutes to two or three days. Pressure equipment may be useful when the reaction is conducted above the boiling point of one of the ingredients of the reaction mixture. The reactions are generally conducted in an inert medium, which is a solvent for the reactants and/or reaction product.

When 1,2,4-triazoles are used, the carbamyl substituent can be present on any of the nitrogens as shown by Formulas I and II. Repetition of the general process of Examples I and III except that the 1,2,4-triazole is 3-phenoxymethyl-1,2,4-triazole,
3-methoxymethyl-1,2,4-triazole,
3-carboethoxymethyl-1,2,4-triazole,
3-phenyl-1,2,4-triazole,
3-p-methoxyphenyl-1,2,4-triazole,
3-p-chlorophenyl-1,2,4-triazole,
3,5-diphenyl-1,2,4-triazole,
3,5-di-p-nitrophenyl-1,2,4-triazole,
5-methyl-3-phenyl-1,2,4-triazole, and
3,5-diethyl-1,2,4-triazole results in the formation of 1-N,N-dimethylcarbamyl-3-phenoxymethyl-1,2,4-triazole,
1-N,N-dimethylcarbamyl-3-methoxymethyl-1,2,4-triazole,
1-N,N-dimethylcarbamyl-3-carboethoxymethyl-1,2,4-triazole,
1-N,N-dimethylcarbamyl-3-phenyl-1,2,4-triazole,
1-N,N-dimethylcarbamyl-3-p-methoxyphenyl-1,2,4-triazole,
1-N,N-dimethylcarbamyl-3-p-chlorophenyl-1,2,4-triazole,
1-N,N-dimethylcarbamyl-3,5-diphenyl-1,2,4-triazole,
1-N,N-dimethylcarbamyl-3,5-di-p-nitrophenyl-1,2,4-triazole,
1,N,N-dimethylcarbamyl-5-methyl-3-phenyl-1,2,4-triazole and
1-N,N-dimethylcarbamyl-3,5-diethyl-1,2,4-triazole.

When 3-phenyl-1,2,4-triazole is reacted with N,N-dimethylthiocarbamyl chloride, according to the general process of Example II, there results 1-N,N-dimethylthiocarbamyl-3-phenyl-1,2,4-triazole.

By reaction of 3,5-dimethyl-1,2,4-triazole with N-pyrrolidine carbonyl chloride by the general procedure of Example XXX, or with N-morpholinocarbonyl chloride in the presence of triethylamine or similar acid acceptor, there results the corresponding 1-(N,N-tetramethylenecarbamyl)-3,5-dimthyl-1,2,4-triazole, also named 1-N-pyrrolidylcarbonyl-3,5-dimethyl-1,2,4-triazole, or 1-(N-morpholinocarbonyl)-3,5-dimethyl-1,2,3-triazole.

Benzylation of 3-mercapto-1,2,4-triazole followed by reaction with dimethylcarbamyl chloride gives 1-N,N-dimethylcarbamyl - 3-benzylmercapto-1,2,4-triazole, which after reduction with hydrogen and platinum oxide yields 1 - N,N-dimethylcarbamyl-3-mercapto-1,2,4-triazole (see also Example XXIX).

When phosgene is reacted with 3,5-dimethyl-1,2,4-triazole, there is obtained the corresponding carbonyl chloride on nuclear nitrogen of the triazole. Reaction of the latter compound with diethylamine, di-n-butylamine, methylethylamine, 3-azabicyclo[3.2.2]nonane, 4-benzylpiperidine, 2-methylpiperidine, 2,4,6-trimethylpiperidine, ethyl nipecotate, methyl n - hexylamine, methyl-β-methoxy-ethylamine, and N-methoxy methylamine results in the formation of 1-N,N-diethylcarbamyl-3,5-dimethyl-1,2,4-triazole,
1-N,N-di-n-butylcarbamyl-3,5-dimethyl-1,2,4-triazole,
1-N-methyl-N-ethylcarbamyl-3,5,-dimethyl-1,2,4-triazole,
1-N-(3-azabicyclo[3,2,2]nonyl)carbonyl-3,5-dimethyl-1,2,4-triazole,
1-(4-benzylpiperidyl)carbonyl-3,5-dimethyl-1,2,4-triazole,
1-(2-methylpiperidyl)carbonyl-3,5-dimethyl-1,2,4-triazole,
1-(2,4,6-trimethylpiperidyl)carbonyl-3-5-dimethyl-1,2,4-triazole,
1-N-(ethylnipecotyl)carbonyl-3,5-dimethyl-1,2,4-triazole,
1-N-methyl-N-n-hexylcarbamyl-3,5-dimethyl-1,2,4-triazole,
1-N-methyl-N-β-methoxyethylcarbamyl-3,5-dimethyl-1,2,4-triazole, and
N-methoxy-N-methylcarbamyl-3,5-dimethyl-1,2,4-triazole.

When the general procedure of Example III is repeated with other carbamyl halides, the following tabulation shows the compound obtained and the carbamyl halide employed:

1-(N-methyl-N-2-hexylcarbamyl)-3-methyl-1,2,4-triazole from methyl-2-hexylcarbamyl chloride;
1-(N-methyl-N-allylcarbamyl)-3-methyl-1,2,4-triazole from methyl allyl carbamyl chloride;
1-(N-methyl-N-2-methoxyethylcarbamyl)-3-methyl-1,2,4-triazole from methyl-2-ethoxyethyl carbamyl chloride;
1-(N-methyl-N-2-n-butoxyethylcarbamyl)-3-methyl-1,2,4-triazole from methyl-2-n-butoxyethyl carbamyl chloride;
1-(N-methyl-N-2-hydroxy-n-hexylcarbamyl)-3-methyl-1,2,4-triazole from methyl-2-hydroxy-n-hexylcarbamyl chloride;
1-(N-methyl-N-dimethylaminocarbamyl)-3-methyl-1,2,4-triazole from methyl-N-dimethylaminocarbamyl chloride;
1-(N-methyl-N-1-methyl-2-carboethoxyethylcarbamyl)-3-methyl-1,2,4-triazole from methyl-1-methyl-2-carboethoxyethylcarbamyl chloride;
1-(N-methyl-N-β-cyanoethylcarbamyl)-3-methyl-1,2,4-triazole from methyl-β-cyanoethylcarbamyl chloride;
1-(N-methyl-N-2-N,N-dimethylcarboxamidoethylcarbamyl)-3-methyl-1,2,4-triazole from methyl-2-N,N-dimethylcarboxamidoethylcarbamyl chloride;
1-(N-methyl-N-1-methyl-3-carboxamidopropylcarbamyl)-3-methyl-1,2,4-triazole from N-methyl-N-(1-methyl-3-carboxamidopropyl)-carbamyl chloride;
1-(N-methyl-N-1-methyl-4-carboethoxybutylcarbamyl)-3-methyl-1,2,4-triazole from N-methyl-N-1-methyl-4-carboethoxybutylcarbamyl chloride;
1-(N-methyl-N-1-ethyl-2-cyanopropylcarbamyl)-3-methyl-1,2,4-triazole from N-methyl-N-1-ethyl-2-cyanopropylcarbamyl chloride;
1-(N-methyl-N-1-methyl-4-N,N-diethylcarboxamidobutylcarbamyl)-3-methyl-1,2,4-triazole from N-methyl-4-N,N-diethylcarboxamidobutylcarbamyl chloride;
1-(N-methyl-N-3-diethylaminopropylcarbamyl)-3-methyl-1,2,4-triazole from N-methyl-N-3-diethylaminopropylcarbamyl chloride;
1-(N-[1,2,3,6-tetrahydropyridino]carbonyl)-3-methyl-1,2,4-triazole from 1,2,3,6-tetrahydropyridinocarbonyl chloride (alternatively named as dehydropiperidines);
1-(N-[3-methyl-1-piperidino]carbonyl)-3-methyl-1,2,4-triazole from 3-methylpiperidinocarbonyl chloride;
1-(N-[3-ethyl-1-piperidino]carbonyl)-3-methyl-1,2,4-triazole from 3-ethylpiperidinocarbonyl chloride;
1-(N-[1-ethylnipecotato]carbonyl)-3-methyl-1,2,4-triazole from 1-ethylnipecotatocarbonyl chloride;
1-(N-[1-ethylisonipecotato]carbonyl)-3-methyl-1,2,4-triazole from 1-ethylisonipecotatocarbonyl chloride;
1-(N-[4-methylpiperidino]carbonyl)-3-methyl-1,2,4-triazole from 4-methylpiperidinocarbonyl chloride;
1-(N-[4-n-butylpiperidino]carbonyl)-3-methyl-1,2,4-triazole from 4-n-butylpiperidinocarbonyl chloride;
1-(N-[4-trifluoromethylpiperidino]carbonyl)-3-methyl-1,2,4-triazole from 4-trifluoromethylpiperidinocarbonyl chloride;
1-(N-[4-cyclohexylmethylpiperidino]carbonyl)-3-methyl-1,2,4-triazole from 4-cyclohexylmethylpiperidinocarbonyl chloride;
1-(N-[4-benzylpiperidino]carbonyl)-3-methyl-1,2,4-triazole from 4-benzylpiperidinocarbonyl chloride;
1-(N-[4-dimethylcarboxamidopiperidino]carbonyl)-3-methyl-1,2,4-triazole from 4-N,N-dimethylcarboxamidopiperidinocarbonyl chloride;
1-(N-[4-hydroxypiperidino]carbonyl)-3-methyl-1,2,4-triazole from 4-hydroxypiperidinocarbonyl chloride; and
1-(N-[3-methyl-4-ethylpiperidino]carbonyl)-3-methyl-1,2,4-triazole from 3-methyl-4-ethylpiperidinocarbonyl chloride.

Using the appropriate amines and triazoles by the procedures detailed in the preceding description, the following disubstituted carbamyl triazoles are obtained:

1-(N-n-octyl-N-3-propylaminopropylcarbamyl)-3-benzylthio-5-methyl-1,2,4-triazole;
1-(N-3-dibutylaminopropyl-N-propylcarbamyl)-3-chloro-1,2,4-triazole;
1-(N-2-dipropylaminoethyl-N-methylcarbamyl)-3-fluoro-1,2,4-triazole (the 3-fluoro-1,2,4-triazole obtained by diazotization of 3-amino-1,2,4-triazole followed by treatment with fluoroborate);
1-(N-5-carboxypentyl-N-methylcarbamyl)-3-fluoro-1,2,4-triazole;
1-(N,N-di[6-carboxyhexyl]carbamyl)-3,5-dimethyl-1,2,4-triazole;
1-(N-2-salicyloxyethyl-N-methylcarbamyl)-3-methyl-1,2,4-triazole;
1-(N-3-ethoxycarbonylpropyl-N-propylcarbamyl)-3-trifluoromethyl-1,2,4-triazole (the 3-trifluoromethyl-1,2,4-triazole obtained by reacting trifluoroacetyl chloride with thiosemicarbazide followed by treatment with sodium ethoxide);
1-(N,N-di[5-methoxycarbonylpentyl]carbamyl)-3-(2-chloroethyl)-1,2,4-triazole;
1-(N,N-di-n-heptylcarbamyl)-3,5-dimethyl-1,2,4-triazole;
1-(N-methyl-N-2-pentenylcarbamyl)-3-methyl-1,2,4-triazole;
1-(N,N-di[2-ethoxyethyl]carbamyl)-3-chloro-1,2,4-triazole;
1-(N-propyl-N-10-hydroxyhendecylcarbamyl)-1,2,4-triazole;
1-(N,N-di[6-carbonamidohexyl]carbamyl)-3,5-dimethyl-1,2,4-triazole;
1-(N,N-di[2-diethylcarbonamidoethyl]carbamyl)-3,5-dibenzyl-1,2,4-triazole;
1-(N-4-carboxycyclohexylmethyl-N-methylcarbamyl)-3-methylsulfoxyl-5-methyl-1,2,4-triazole;
1-(N-2-[1-hydroxyethylpiperidino]carbonyl)-3-methylthio-5-methyl-1,2,4-triazole;

1-N-(4-cyclohexylmethylpiperidino)-carbonyl-3-trifluoromethyl-1,2,4-triazole;
1-N-(4-hydroxy-4-phenylpiperidino)carbonyl-1,2,4-triazole;
1-(N-(4-methylcyclohexylpiperidino)carbonyl-3-(4-piperidyl)-1,2,4-triazole;
1-N-(4-n-nonylpiperidino)carbonyl-1,2,4-triazole;
1-N-(2-ethyl-3-hydroxy-n-hexylpiperidino)carbonyl-3,5-dichloro-1,2,4-triazole;
1-N-(2-diethylaminoethylpiperidino)-carbonyl-3-methyl-1,2,4-triazole;
1-N-(2-ethoxyethylpiperidino)carbonyl-1,2,4-triazole.

The new triazoles of this invention are relatively stable. They are generally liquids or low-melting solids. They are effective insecticides, particularly against mites and aphids. For example, the triazoles of this invention may be used to control aphids on crops and ornamental plants. When a 0.01–0.05% suspension of a triazole of this invention in 10/90 acetone/water is applied to the soil surrounding nasturtiums and watered in, these nasturtiums The application of triazole suspensions in water/acetone are rendered toxic to aphids for extended periods of time. to the foliage of lima bean plants renders the foliage toxic to aphids for a considerable time.

They are useful as solvents for polar and nonpolar compounds and can be used as the reaction medium for such reactions as replacement of halogen by the CN group of potassium cyanide.

Dialiphatically substituted carbamyl triazoles within the scope of this invention are useful in dyeing textiles. A dye obtained from heating one part of 1-dimethylcarbamyl - 3(5) - methylmercapto - 5(3) - methyl - 1,2,4-triazole and 1.5 parts of quinaldine ethiodide to reflux in ten parts of absolute ethyl alcohol containing one-half part of anhydrous sodium acetate for three hours was purified by crystallization from ethyl alcohol. An aqueous or alcohol solution of the dye shows absorption maxima at 510 and 548 m$\mu$.

A swatch of fabric woven of test fibers was immersed in an aqueous alcohol solution of the above red-magenta dye and heated on the steam bath for one hour. The fabric was stirred occasionally in the bath to avoid uneven dyeing in folds and creases. The dyed swatch was then washed twice with Ivory soap and water and dried. Fibers were dyed various shades of pink to red as follows: acetate and acrylonitrile fibers—light pink; viscose—very light pink; cotton—flesh pink; nylon—dark pink; silk—deep magenta; and wool—red magenta.

As previously mentioned, some of the classes of compounds within the scope of this invention exhibit pharmaceutically useful analgesic properties. The analgesic activity was measured in standard animal tests. Activity and therapeutic ratios determined for compounds included in these cases are equal to or better than those found for morphine. Tests used to determine analgesic activity were the Hot Plate test described by Eddy in the "Journal of Pharmacology and Experimental Therapeutics," vol. 98, pages 121–137 (1950) and a modification of the method of Bass and Brook described in the "Journal of the American Pharmaceutical Association," vol. 41 (10), page 569 (1952) in which radiant heat is used to produce a response in test animals. Both of these tests are standard tests used by investigators in the field of analgesia and have been found to give indication of potential analgesic activity in man.

Thus, for example, when 1-N,N-dimethylcarbamyl-3-(4-pyridyl)-1,2,4-triazole (see Example XXVII) is used in standard laboratory tests, the analgesic activity is equivalent to that exhibited by morphine. Analgesic activity superior to that of morphine is obtained by use of 1-(4-n-propylpiperidinocarbonyl)-1,2,4-triazole (Example XXX) and 1-(4-methylpiperidinocarbonyl)-1,2,4-triazole (Example XXXI). Useful analgesic activity is also shown by 1-N,N-dimethylcarbamyl-1,2,4-triazole and 1-N,N-dimethylcarbamyl-3-methyl-1,24-triazole.

In pharmaceutical application a compound of this invention will be administered to the body orally, parenterally and by other methods. The dosage will vary and will depend on such factors as the condition being treated; age and weight of the recipient; the responsiveness of the recipient; prior, concurrrent and intended subsequent medication and treatment; general health of the recipient; frequency of treatment; and of course the purpose and nature of the effect desired.

Generally speaking, the active compound will be administered in a physiologically beneficial amount. Administration can be in a single dose or in a plurality of doses over an extended period of time. It will furthermore be understood that every compound within this invention does not have an identical level of dosage requirement for therapeutic or prophylactic effectiveness and therefore experts will understand that some dosage variation between compounds can be expected for maximum benefits. It will, of course, also be understood that an initial dose, or first group of doses, in a course of treatment can be in greater amounts, if appropriate, for a particular medical situation and a rapid response is sought by the early administration of relatively large doses and thereafter the minimally effective dosage, or maintenance dosage, is determined.

A single dose will rarely exceed about 100 or 200 milligrams of active compound within this invention, although larger amounts can be used as called for in any given situation. Extremely small doses will effect some benefit but as a practical matter a single dose of less than about 0.5 or 1 milligram will seldom be used. For treating small animals with high physiological response and using highly active compounds, routine usage can be at much lower dosage levels however. Doses can be repeated in the same or greater or lesser amounts over a period of time as long as improvement in the recipient is observed or as long as needed under the circumstances.

The compounds will ordinarily be administered with a non-toxic pharmaceutical carrier in a variety of practical dosage forms. These dosage forms are novel compositions comprising the non-toxic pharmaceutical carrier and a physiologically beneficial amount of one or more active compounds of this invention. These highly useful dosage forms constitute an important aspect of the present invention.

Suitable non-toxic pharmaceutical carriers or vehicles include liquids such as water, aromatic water, alcohols, syrups, elixirs, pharmaceutical mucilages, such as acacia and tragacanth, oils such as of petroleum, animal, vegetable or synthetic origin, for example, peanut oil, soybean oil, fish oil such as cod liver oil, or the like, for oral administration; water, saline, aqueous lactose, aqueous maltose, aqueous glucose (dextrose), aqueous sucrose, or the like, for administration by injection. Suitable solid carriers include soft gelatin capsules, hard gelatin capsules, slow or delayed release pills or capsules, powders, tableting vehicles, and the like. Suitable solid or liquid non-toxic pharmaceutical carriers are well known in the art and the selection of carrier can be from those appropriate and available in accordance with well-known prescription techniques. The compositions of this invention therefore include such dosage forms as solution, suspensions, syrups, elixirs, tablets, capsules, powder packets and the like.

A vast number of suitable pharmaceutical carriers are described in "The Pharmaceutical Basis of Therapeutics" by L. G. Goodman and A. Gilman, second edition, 1956, published by the Macmillan Company and "Remington's Practice of Pharmacy" edited by E. W. Martin and E. F. Cook, 12th edition, 1961, published by the Mack Publishing Company, Easton, Pennsylvania.

21

In these novel compositions the active ingredient of the above formulas will be present in a physiologically beneficial amount as mentioned above. In practice this means that the active ingredient will ordinarily constitute at least about 0.02% by weight based on the total weight of the composition. For oral administration in water or other liquid medium, the concentration will ordinarily be in the range from about 0.02 to 2% by weight of active ingredient. For injection, concentrations from 0.05 to 5% are satisfactory. In tablets, powders, capsules and the like the amount of active ingredient may if desired be as much as 95 or 98% or more by weight of the total composition.

The active compounds of this invention can be formulated if desired with one or more pharmaceutically active materials for combination effects, treatments and benefits. Such materials include but are by no means limited to vitamins, pain killers, tranquilizers, antibiotics, antitussive agents, etc. The compositions can, of course, contain suitable pharmaceutical modifiers such as coloring agents, sweetening or other flavoring agents, solubilizing agents, etc. as will readily occur to persons skilled in this art.

The following further illustrate specific pharmaceutical compositions for administration to a living body:

*Example A*

1-N,N-dimethylcarbamyl - 1,2,4 - triazole is formulated conveniently as an injectable solution of 0.5%, 1.0% and 5% by weight concentration in isotonic saline; as an injectable solution in 0.5%, 1.0% and 5% by weight concentrations in aqueous sugars including in separate solutions lactose, maltose, glucose, and sucrose; in water in 0.1, 0.2, 0.3, 0.4 and 1.0% by weight concentration for oral administration, with and without a flavoring agent, a coloring agent, an antitussive agent, etc.; and in 5, 10, 25 and 50 milligram amounts in standard two-piece hard gelatin capsules with a diluent such as starch, mannitol or lactose, for oral administration. In pharmacologic applications it is administered in these dosage forms at dosage levels preferably in the range of 2.5–50 milligrans for treatment of physiologic conditions as described above.

*Example B*

1-N,N-dimethyl-3-methyl-1,2,4-triazole can be formulated with suitable tableting adjuvants using a conventional tableting machine with the active ingredient constituting 5–50% by weight of the tablet. Other ingredients include gelatin, magnesium stearate, and starch, lactose, or mannitol.

Other compounds which can be similarly formulated include:

1-N,N-dimethylcarbamyl-1,2,4-triazole,
1-N,N-dimethylcarbamyl-3-(4-pyridyl)-1,2,4-triazole,
1-(4-methylpiperidinocarbonyl)-1,2,4-triazole, and
1-(4-n-propylpiperidinocarbonyl)-1,2,4-triazole.

*Example C*

1-(4-methylpiperidinocarbonyl) - 1,2,4 - triazole can be formulated in a soft gelatin capsule by dissolving the compound in Polyethylene Glycol 400 in concentrations of 1.0 to 10%, w./v. The solution containing the compound is injected into the gelatin to form the capsule using a positive displacement pump set to deliver a specific volume depending on the dose required. The capsules are then dried before administration for relief of various types of pain.

Other compounds which can be similarly formulated include:

1-(4-n-propylpiperidinocarbonyl)-1,2,4-triazole;
1-N,N-dimethylcarbamyl-1,2,4-triazole;
1-N,N-trimethylcarbamyl-3-methyl-1,2,4-triazole; and
1-N,N-dimethylcarbamyl-3-(4-pyridyl)-1,2,4-triazole.

22

As many apparently widely different embodiments of this invention may be made without departing from the spirit and scope thereof, it is to be understood that this invention is not limited to the specfic embodiments thereof.

The embodiments of the invention in which an exclusive property or privilege is claimed are defined as follows:

1. A 1,2,4-triazole selected from the class consisting of

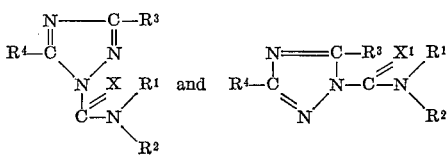

wherein
(A) X is selected from the group consisting of O and S;
(B) $R^1$ and $R^2$ are selected from the group consisting of
   (1) individually, groups wherein $R^1$ is methyl, and $R^2$ is of up to 8 carbon atoms and is selected from the group consisting of alkyl, alkenyl, alkoxyalkyl, hydroxyalkyl, methylalkylamino, alkylaminoalkyl, dialkylaminoalkyl, carboxyalkyl, carbalkoxyalkyl, carbonamidoalkyl and cyanoalkyl, and
   (2) joined together, groups which form a heterocyclic ring with the carbamyl nitrogen selected from the group consisting of morpholino, pyrrolidyl, piperidyl, dehydropiperidyl, azabicyclononyl, α-methylpiperidyl, and substituted piperidyl of the structure

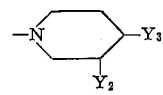

wherein
   $Y_2$ is selected from the group consisting of hydrogen, methyl, ethyl and —$COOR^5$ where $R^5$ is alkyl of 1–4 carbon atoms, and
   $Y_3$ is selected from the group consisting of hydrogen, hydroxyl, alkyl of 1–4 carbon atoms, cycloalkylalkyl of 4–9 carbon atoms, hydroxyalkyl of 2–9 carbon atoms, alkoxyalkyl of 3–9 carbon atoms, trifluoromethyl, $COOR^5$ where $R^5$ is alkyl of 1–4 carbon atoms, carbonamido having up to two 1–4 carbon alkyl groups attached to the amide nitrogen, dialkylaminoalkyl where each alkyl of the dialkyl portion has up to 2 carbon atoms and the remaining alkyl up to 4 carbon atoms, pyrrolidinomethyl, and arylalkyl of 7–9 carbon atoms,
   and wherein at most one of $Y_2$ and $Y_3$ is hydrogen; and
(C) $R^3$ and $R^4$ together contain up to 14 carbon atoms free of aliphatic unsaturation and are selected from the group consisting of hydrogen, halogen, sulfonyl, mercapto, cyano, hydrocarbyl, halohydrocarbyl, nitrohydrocarbyl, hydrocarbyloxycarbonylhydrocarbyl, hydrocarbylsulfonyl, hydrocarbylmercapto, nitrohydrocarbylmercapto, halohydrocarbylmercapto, aminohydrocarbylmercapto and hydrocarbyloxyhydrocarbyl.

2. A 1,2,4-triazole of the formula

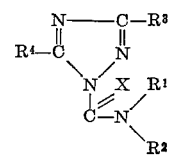

wherein
X is oxygen,
$R^1$ is —$CH_3$,
$R^2$ is alkyl of up to eight carbon atoms,
$R^3$ is hydrogen, and
$R^4$ is hydrogen.

3. A 1,2,4-triazole of the formula

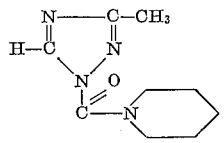

4. 1-N,N-dimethylcarbamyl-1,2,4-triazole.
5. 1-N,N-dimethylcarbamyl-3-methyl-1,2,4-triazole.
6. 1-N,N-dimethylcarbamyl-3-(4 - pyridyl) - 1,2,4-triazole.
7. 1-(4-methylpiperidinocarbonyl)-1,2,4-triazole.
8. 1-(4-n-propylpiperidinocarbonyl)-1,2,4-triazole.
9. 1-N,N - dimethylcarbamyl - 3 - methylmercapto - 5-methyl-1,2,4-triazole.

References Cited by the Examiner
UNITED STATES PATENTS 2,352,944   7/1944   D'Alelio _____ 260—308

FOREIGN PATENTS 919,458   2/1963   Great Britain.
1,193,374   11/1959   France.

OTHER REFERENCES

Brunner et al.: Monatsh. vol. 47, 741–746 (1927).
Chemie, vol. 4, Formula 424, S. Kroger, N. Y. (1950).
F. Degering et al.: Org. Nitrogen Compounds, page 490, reaction 1490, Univ. Litho Printers, Ypsilanti, Mich., 1950.
Theilheimer: Synthetische Methoden de Organic, vol. 4, 1950.
Wagner Zook, Synthetic Org. Chem., page 647, reaction 421, J. Wiley, N.Y. (1953).

WALTER A. MODANCE, *Primary Examiner.*
AVROM D. SPEVACK, *Assistant Examiner.*